A. C. HOPKINS.
COMBINED AUTOMOBILE JACK AND AMBULANCE.
APPLICATION FILED JAN. 17, 1919.
1,303,318.
Patented May 13, 1919.
4 SHEETS—SHEET 3.
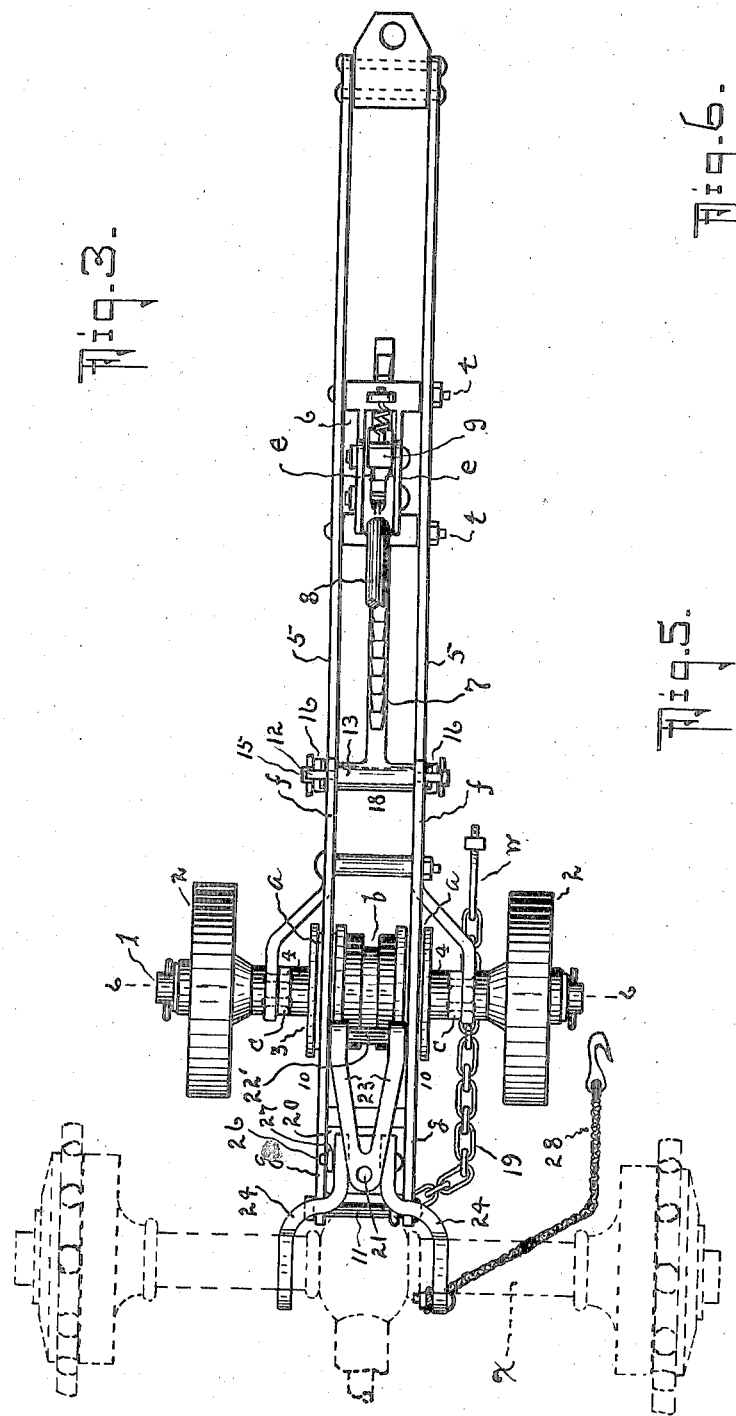
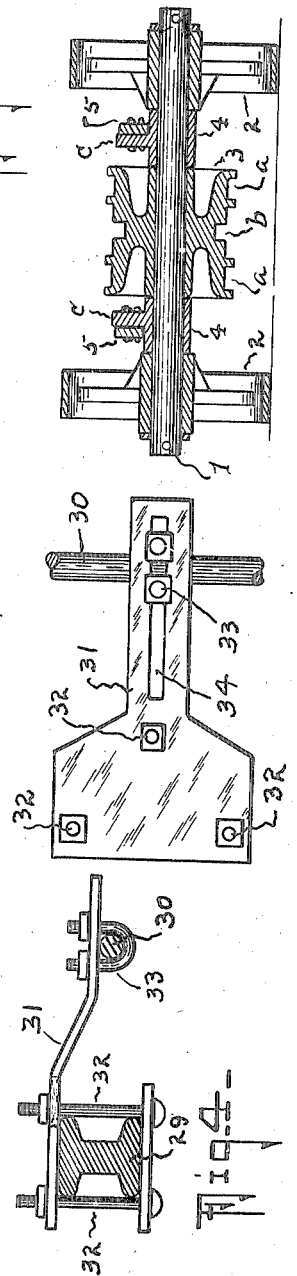
Inventor
ARTHUR C. HOPKINS.
By Arthur H. Sturges.
Attorney

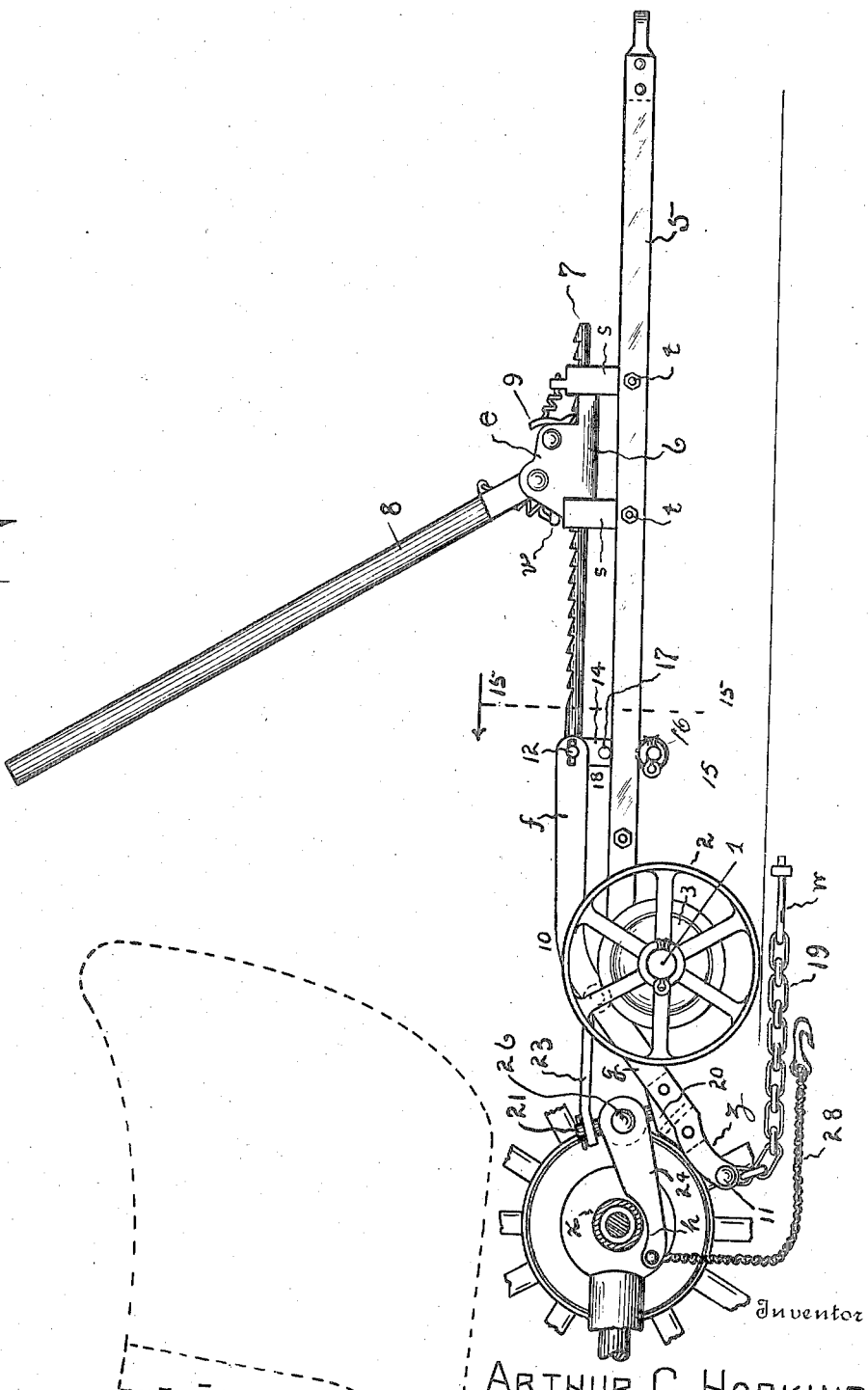

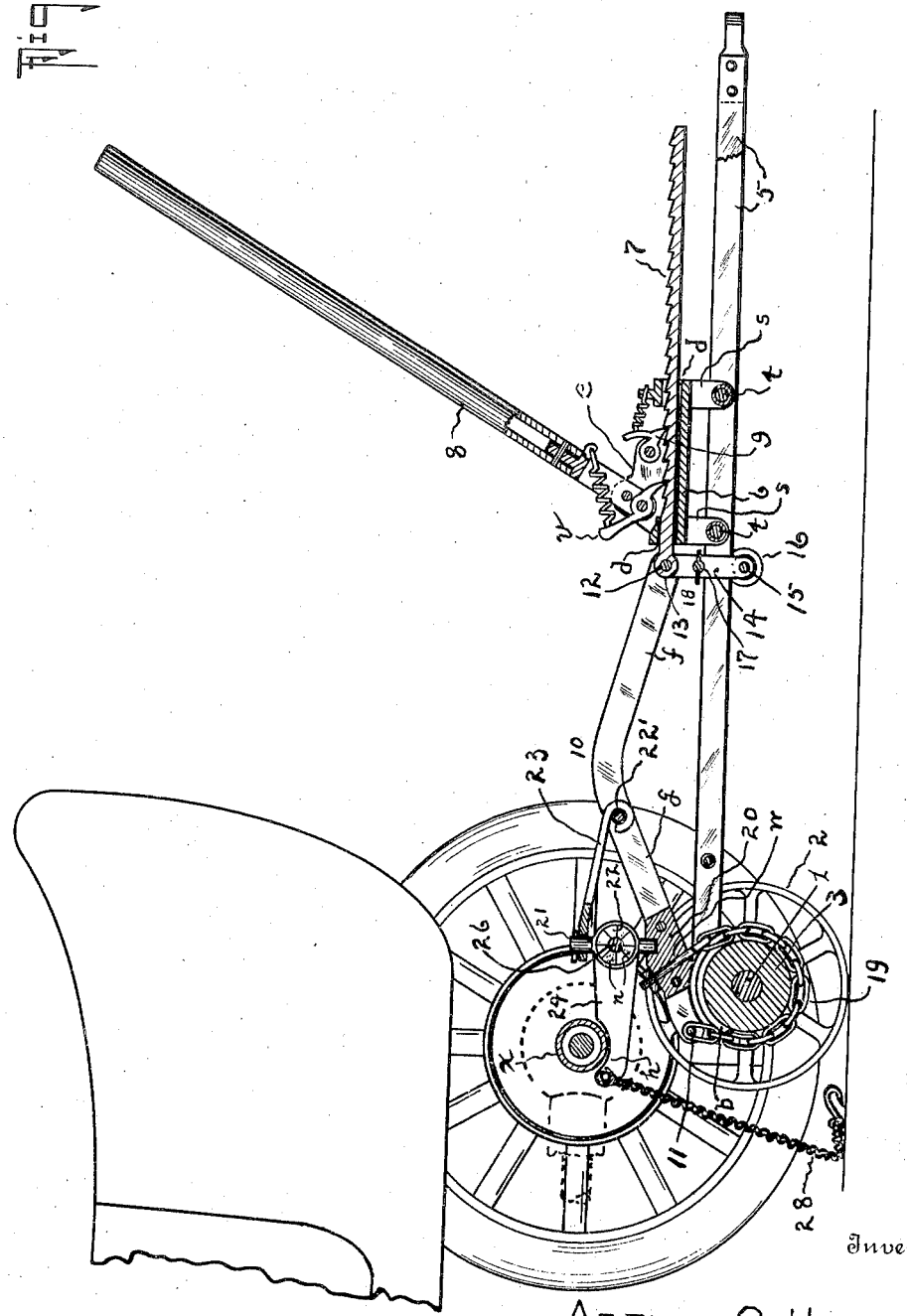

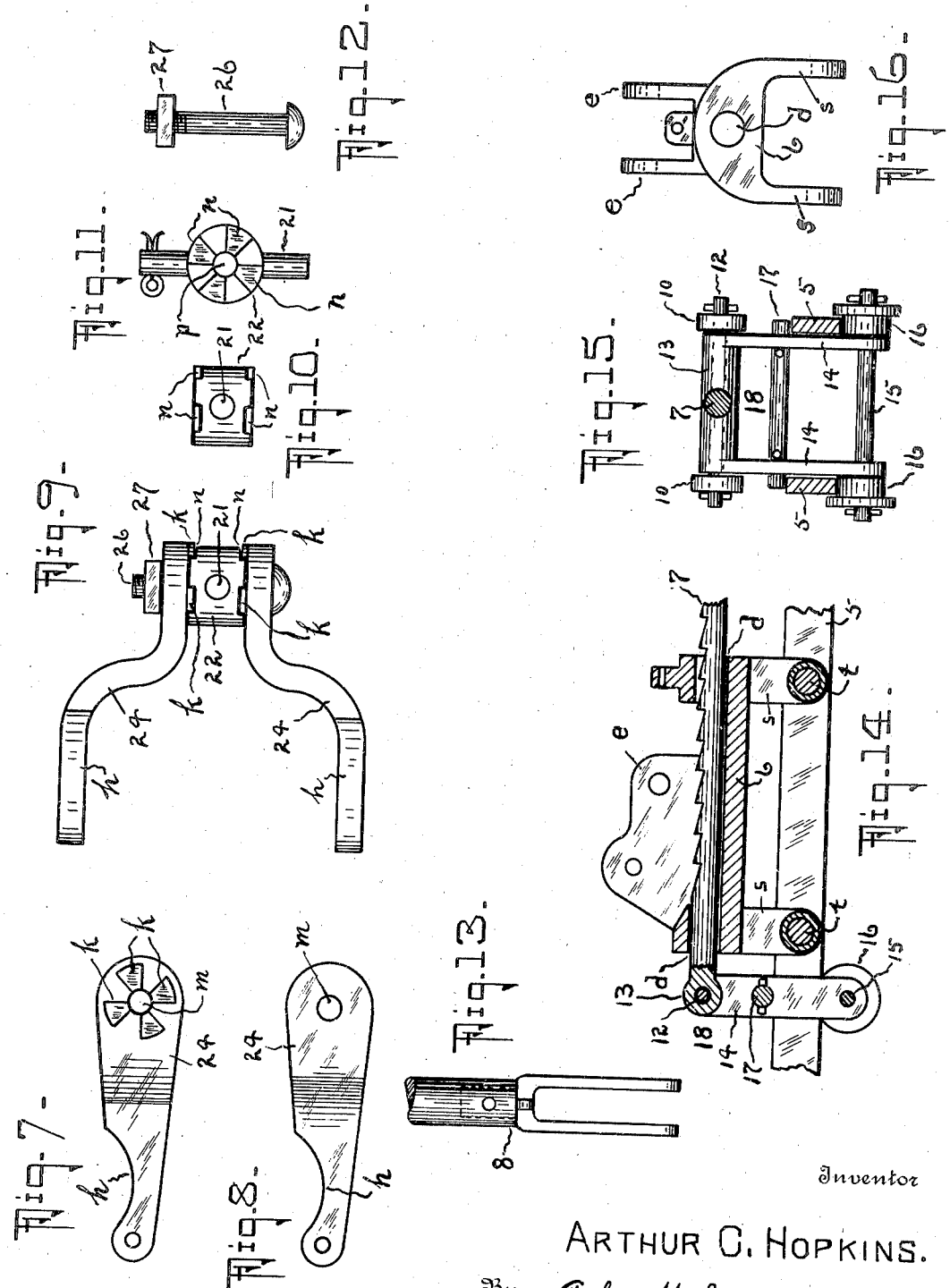

UNITED STATES PATENT OFFICE.

ARTHUR C. HOPKINS, OF MINNEAPOLIS, MINNESOTA, ASSIGNOR TO MID-WEST MANUFACTURING COMPANY, OF SIOUX FALLS, SOUTH DAKOTA.

COMBINED AUTOMOBILE JACK AND AMBULANCE.

1,303,318. Specification of Letters Patent. Patented May 13, 1919.

Application filed January 17, 1919. Serial No. 271,619.

*To all whom it may concern:*

Be it known that I, ARTHUR C. HOPKINS, a citizen of the United States, residing at Minneapolis, in the county of Hennepin and State of Minnesota, have invented certain new and useful Improvements in Combined Automobile Jacks and Ambulances, of which the following is a specification.

The object of the present invention is to provide a combined jack and ambulance by means of which an automobile or one of its axles may be readily elevated and the automobile conveniently moved. The invention broadly includes a grooved spool or roller on the axle of a truck, and an angular operating-lever movable on the spool for elevating the load, devices being provided for engagement with the axle of the automobile for elevating it, and convenient means being employed for securing said axle to the truck for moving the automobile.

The invention has reference to means particularly adapted for use in elevating and moving an automobile without loss of time, and regardless of its size or weight, said means also being convenient in operation.

The novel features of the invention are fully described herein and in the appended claims, and are illustrated in the accompanying drawings, wherein,—

Figure 1 is a side view of a combined automobile jack and ambulance embodying my invention, a broken away automobile wheel, in disengaged relation therewith, also being shown. Fig. 2 is a view of the same in longitudinal section, an automobile wheel being shown attached and in an elevated position. Fig. 3 is a plan view of the combined automobile jack and ambulance, the parts being disposed as shown in Fig. 1. Fig. 4 is a side view of a locking-plate used in connection with the ambulance, a front axle and a reach-rod being shown in transverse section. Fig. 5 is a plan view of the locking-plate shown in Fig. 4.

Fig. 6 is a sectional view through the truck taken on line 6—6 of Fig. 3. Fig. 7 is a view of the inner side of one of the arms of an axle-engaging fork. Fig. 8 is a view of the outer side of the arm shown in Fig. 7. Fig. 9 is a plan view of the axle-engaging fork. Fig. 10 is a plan view of a locking block, being a part of the fork shown in Fig. 9.

Fig. 11 is an end view of the locking-block. Fig. 12 is a view of the bolt for connecting the arms of the fork with the locking-block. Fig. 13 is a broken away detail showing the lower end of the hand-lever. Fig. 14 shows an alining-chair for the rack-bar, the view being in longitudinal section. Fig. 15 is a view of the movable frame for the operating-lever, the section being on line 15—15 of Fig. 1. Fig. 16 is an end view of the alining-chair for the rack-bar.

I provide a truck consisting of the axle 1 upon which are journaled the pair of wheels 2, and journaled upon said axle midway between the wheels, is a spool 3 provided adjacent to its ends with circumferential grooves $a$ and midway between its ends with groove $b$, said axle also being provided between the spool and the hubs of the wheel 2 with a pair of sleeves 4, each having an upwardly projecting arm $c$.

Numerals 5 indicate a pair of connected, rearwardly projecting side-bars to provide a tongue for the truck, their inner ends being suitably curved and having a rigid mounting upon the arms $c$ of sleeves 4; and mounted rigidly upon the tongue, midway between the ends thereof, is a chair 6 provided with apertures $d$ for receiving a rack-bar 7 and having a pair of side plates $e$ for the pivotal mounting of a hand-lever 8, whereby a rocking movement of the latter in one direction will cause a movement of the rack-bar toward the free end of the tongue, the resiliently mounted pawl 9 of the hand-lever operating for this purpose in engagement with the teeth of the rack-bar. The chair is provided with projections $s$ at its ends, said projections being secured to the side bars 5 by bolts $t$.

I provide an operating lever 10 consisting of a pair of arms or bars approximately parallel in plan indicated respectively at $f$ and $g$, these being of uniform size and proportion, the arms of each pair being disposed at an obtuse angle with reference to each other, said arms or bars $g$ being connected at their front ends by a bolt 11 and the rear ends of arms $f$ being connected by means of a bolt 12 which traverses the sleeve 13, said sleeve being provided for the inner end of the rack-bar.

The sleeve 13 is provided with a pair of downwardly projecting arms 14 disposed at the inner sides of the side-bars 5 of the tongue, said arms 14 being provided with apertures for receiving a bolt 15 upon which are mounted a pair of rollers 16, and for receiving a bolt 17; and it will be understood that these parts provide a frame 18 adapted to maintain the rear end of the lever 10 equidistant from the rectilinear tongue during its movements longitudinally of said tongue, said frame 18 and bars 10 being moved by the rack-bar by operation of the hand-lever mentioned.

Suitably secured to the front end of the operating lever 10 is a chain 19, and between the arms of said lever adjacent to the chain, is mounted a block 20, which is provided with an upwardly projecting pivot-post or bolt 21, said bolt, midway between its ends being provided with a locking-block 22. Numeral 23 indicates a yoke which is mounted on the upper end of the bolt 21, its arms extending rearwardly for a connection with a bolt 22' which is carried by the operating-lever 10.

I provide an axle-holder or fork, its pair of arms being indicated at 24, each having a depression or concaved part $h$ formed in its upper edge for suitably engaging the lower side of a vehicle axle $x$, its inner end being provided with lugs $k$ on its inner side, preferably of sector form, and also provided with an aperture $m$ midway between the lugs. The locking-block 22 is provided with sector recesses $n$, and it will be understood by referring to Figs. 9 and 10 that the arms of the fork may be pressed against the ends of the locking-block with their lugs engaging in the recesses $n$ by means of a bolt 26 and its keeper 27, said bolt engaging in the aperture $m$ of the arms 24 and also engaging in the aperture $p$ of the locking-block, and by this construction the arms 24 may be adjusted and maintained at a required angle to the upright bolt 21, this being of great advantage since the axle of a vehicle may be disposed near the ground when a wheel is injured or broken, and the arms of the fork may be swung downwardly and maintained at a required angle to permit engagement thereof with the axle. Also it will be noted that the fork may have a swinging movement horizontally from the bolt 21, this being of advantage when disposing the arms 24 in engagement with the axle of an automobile, and also of advantage when the ambulance is moved upon curves as a carrier of an injured automobile.

In operation, the ambulance is moved near to the axle of an automobile and by releasing the pawls 9 and $v$ from the teeth of the rack bar 7 the operating-lever 10 may readily be moved forwardly while engaging in the grooves $a$ of the spool 3, the rollers 16 of the carrier-frame 18 engaging the side bars 5. If the automobile to be moved is so disabled that its axle is disposed near the ground, as occasionally happens, an adjustment is made of the arms 24 of the yoke so that they will engage the lower side of the axle, as heretofore explained. By use of a chain 28 which is mounted on the yoke the latter is secured to the axle in a well known manner, and thereafter, by use of the hand-lever 8, the lever 10 is moved rearwardly, the spool having a dependable rotatable movement, and the automobile is moved rearwardly until the axle is elevated substantially to the position shown in Fig. 2. The front ends of the arms of lever 10 are formed with a concaved recess $z$ (Fig. 1) conforming to the curvature of the spool and they may be secured to the spool by any suitable means, the means herein shown being the chain 19 adapted to engage in the groove $b$ of the spool 3, said chain being provided at its terminal with a pin $w$ adapted to engage within and to be secured in an aperture formed in the block 20, as best shown in Fig. 2. The automobile is then conveyed by the ambulance in the usual manner.

It is obvious that both the front and rear axles of an automobile may be elevated by means of the herein described device, if required. Numeral 29 indicates the front axle of an automobile, and at 30 is indicated the conventional reach-rod of an automobile, said reach-rod being a part of the steering gear or mechanism, and in order to prevent a swinging movement transversely of the line of travel, a locking-plate 31 is employed, its front end being secured to the front axle by means of bolts 32, and its rear end being secured to the reach-rod by means of a staple 33 adapted to be adjusted in the slot 34, this simple device being of great advantage when the ambulance is attached to the rear axle, since a disabled automobile is moved rearwardly by the ambulance, and steering or direction of movement of the automobile then depends upon the movements of the ambulance.

By referring to Fig. 2 it will be noted that the bolt 21 which sustains the weight of the load is disposed rearwardly of the axle 1 of the truck, this being an advantage since the stresses occasioned by the weight and directed to the yoke 23 and bolt 22' will be less, also on this account there will be a lesser tendency for an upward swinging movement of the tongue when the truck sustains the load.

While I have explained construction in detail I do not wish to be understood as limiting myself in this respect, and changes in size, form and proportion, as well as minor details may be made provided said changes are within the scope of the invention as claimed.

I claim:

1. In a combined automobile jack and ambulance, an axle provided with wheels and having a rearwardly extending tongue, an operating-lever having arms substantially parallel in plan and provided with a pivot-post, said lever being movable longitudinally of the tongue to dispose its front end forwardly of and downwardly with reference to the axle, devices on the pivot-post for connecting a part of an automobile with the pivot post, means for moving said bar longitudinally to dispose its front end above the axle, and means to maintain the rear end of the operating-lever equidistant from the tongue during its movements.

2. In a combined automobile jack and ambulance, an axle provided with wheels and having a rearwardly extending tongue, an operating-lever bent midway between its ends to provide arms disposed at an obtuse angle with reference to each other, said lever being movable longitudinally of the tongue to dispose its front end forwardly of and below the axle, devices on the operating-lever for connecting it with a part of an automobile, means for moving said operating-lever longitudinally to dispose its front end above the axle, and means to maintain the rear end of said lever at substantially uniform distances from the tongue during its movements.

3. In a combined automobile jack and ambulance, an axle provided with wheels and having a rearwardly extending tongue, a spool journaled on the axle, an operating lever consisting of a pair of arms approximately parallel in plan and provided with a pivot-post, said lever being movable longitudinally of the tongue in engagement with the spool to dispose its front end forwardly of and below the plane of the axle, devices on the pivot-post for a connection with a part of an automobile, means for moving said lever longitudinally in engagement with the spool to dispose its front end above the plane of the axle, and means to maintain the rear end of the operating lever equidistant from the tongue.

4. In a combined automobile jack and ambulance, an axle provided with wheels and having a rearwardly extending tongue, a spool journaled on the axle, an operating-lever consisting of a pair of arms parallel in plan and engaging the spool, said lever being movable longitudinally of the tongue to dispose its front end forwardly of and below the plane of the axle, devices on the operating lever for connecting it with a part of an automobile, means for moving said operating lever longitudinally to dispose its front end above the plane of the axle, and means to maintain the rear end of said lever approximately at uniform distances from the tongue during its movements.

5. A combined vehicle jack and ambulance, comprising, in combination with an axle provided with wheels and having a rearwardly extending tongue, a spool journaled on the axle and provided with circumferential grooves, an operating-lever consisting of a pair of connected bars bent to an obtuse angle and engaging in said grooves, means to move the lever longitudinally of the tongue to dispose its front end downwardly and forwardly of the axle, a fork connected with the lever and adapted to have movements in a circle's arc for engaging a part of a vehicle, means to maintain the fork at a predetermined angle of a circle's arc, means to move the lever longitudinally of the tongue to dispose its front end above said axle, and means to maintain the rear end of the lever at uniform distances from the tongue.

6. In a combined vehicle jack and ambulance, an axle provided with wheels and a rearwardly projecting tongue, a spool journaled on the axle and having circumferential grooves, an operating-lever including a pair of connected bars of obtuse-angle form engaging in said grooves and adapted to have a movement longitudinally of the tongue to dispose its front end downwardly and forwardly of said axle, a fork having a pivotal mounting on said lever to permit horizontal swinging movements, means in engagement with said fork to permit vertical swinging movements thereof, means to adjust said fork vertically at a predetermined angle of a circle's arc for a connection with a part of a vehicle, means for moving the lever longitudinally for elevating said fork, and means to maintain the rear end of the operating-lever at approximately uniform distances from the tongue.

7. In a combined vehicle jack and ambulance, an axle provided with wheels, a spool journaled on the axle and provided with grooves, a pair of sleeves on the axle, a tongue mounted on the sleeves, an operating-lever including a pair of connected bars having the form of an obtuse angle and engaging in the grooves of the spool, a yoke on the operating-lever, an upright pivot post on said yoke, a fork mounted on the pivot post for engaging a part of a vehicle, said operating lever being adapted to be reciprocated longitudinally for disposing its front end alternately in planes below and above said axle.

8. In a combined vehicle jack and ambulance, an axle provided with wheels, a spool on the axle and provided with circumferential grooves, a tongue rigidly connected with the axle, an operating-lever including a pair of connected bars having the form approximately of an obtuse angle and engaging in the grooves of the spool, means for reciprocating said lever longitudinally to dispose its front end, in alternation, in planes above and below said axles, a fork for engaging a part of a vehicle and movable with the operating lever, a frame engaging the tongue and movable with the operating lever for maintaining the rear end of the latter in spaced relation with said tongue, and a flexible member carried by said operating-lever for engaging said spool.

9. In a combined automobile jack and ambulance, an axle provided with wheels and a tongue, a spool journaled on the axle, an operating-lever having the form approximately of an obtuse angle adapted to be disposed above and in the plane of the tongue and said spool, an upright pivot post movable with the operating-lever, a fork mounted on the pivot post adapted to be moved in a circle's arc, means to maintain said fork at a predetermined angle of a circle's arc, means for moving the operating-lever longitudinally to dispose its front end downwardly and forwardly of the spool, a flexible member for connecting the fork with a part of an automobile, a flexible member for connecting the operating lever with the spool, and a frame engaging the tongue and the operating lever for maintaining the rear end of said lever in spaced relation with the tongue.

10. In a combined vehicle jack and ambulance, an axle provided with wheels, a spool journaled on the axle and provided with grooves, a pair of sleeves on the axle, a tongue having a rectilinear part and mounted on the sleeves, an operating lever including a pair of connected bars having the form of an obtuse angle engaging in said grooves, a yoke on said lever, an upright pivot post on said yoke, a fork mounted on the pivot post, said operating lever being adapted to be reciprocated longitudinally to dispose its front end in alternation, in planes above and below said axle, a flexible member on said fork for a connection with a part of a vehicle, a flexible member on the operating shaft for a connection with said spool, and a frame movable with the operating shaft in engagement with the rectilinear part of said tongue.

In testimony whereof, I have affixed my signature in presence of two witnesses.

ARTHUR C. HOPKINS.

Witnesses:
    ARTHUR H. STURGES,
    HIRAM A. STURGES.